United States Patent

[11] 3,555,348

[72] Inventor Van Clifton Martin Boulder, Colo.

[21] Appl. No. 790,687

[22] Filed Jan. 13, 1969

[45] Patented Jan. 12, 1971

[73] Assignee International Business Machines Corporation Armonk, N.Y. a corporation of New York

[54] CATHODE RAY TUBE SCREEN PROTECTION SYSTEM

6 Claims, 2 Drawing Figs.

[52] U.S. Cl. .................................................. 315/20

[51] Int. Cl. .................................................. H01j 29/52

[50] Field of Search .................................................. 315/20

[56] References Cited

UNITED STATES PATENTS

| | | | |
|---|---|---|---|
| 2,098,384 | 11/1937 | Goodrich .................... | 315/20 |
| 2,210,702 | 8/1940 | Bowman-Manifold ....... | 315/20 |
| 2,709,768 | 5/1955 | King ............................ | 315/20 |
| 2,943,233 | 6/1960 | Vanaman .................... | 315/20 |
| 3,146,372 | 8/1964 | Fertig .......................... | 315/20 |
| 2,810,858 | 9/1969 | Stein ............................ | 315/20 |
| 3,351,804 | 11/1967 | Kongable ..................... | 315/20 |

*Primary Examiner*—Rodney D. Bennett, Jr.
*Assistant Examiner*—Joseph G. Baxter
*Attorney*—John E. Reilly

ABSTRACT: A protection circuit for the screen of a cathode ray tube wherein malfunction or failure in any of the input circuits to the tube which could result in high beam current and local overheating is detected and each malfunction or failure is used to develop a signal indicating that protection is required. Independent control circuits in parallel to one another are each responsive to the signal developed and used to regulate the voltage at the cathode, accelerator grid and horizontal deflection yoke whereby to ensure that the screen will not be damaged by a high beam current. The control circuits are operative together or independently of one another so that if one fails the others will act to protect the tube screen.

Figure 1:
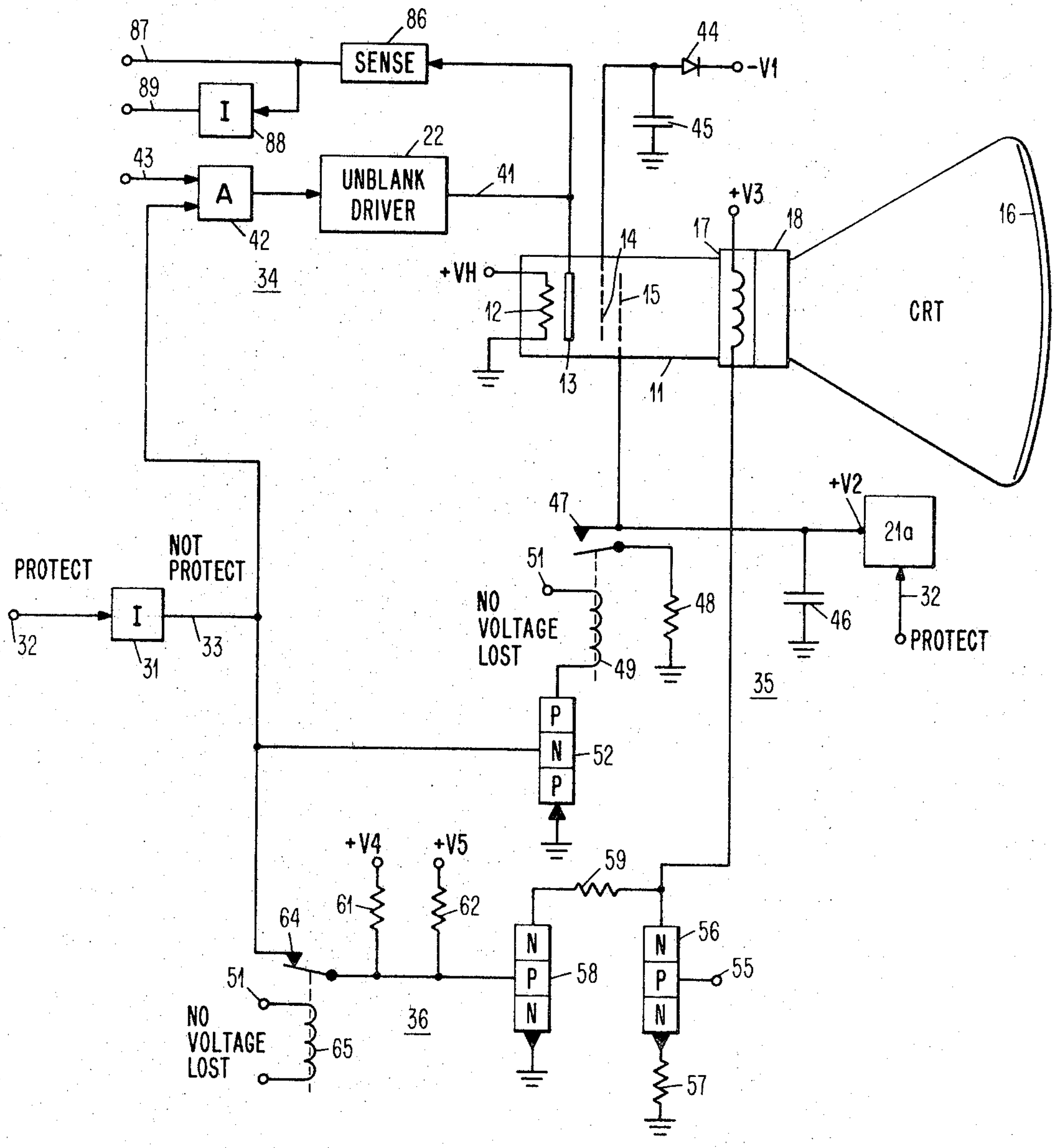

INVENTOR
VAN CLIFTON MARTIN
BY
ATTORNEY

CATHODE RAY TUBE SCREEN PROTECTION SYSTEM

This invention relates to cathode ray tubes and more particularly to a novel and improved protection system for the screen of a cathode ray tube. The invention has applicability where, because of the expense of the cathode ray tube, it is necessary to ensure that the screen will not be damaged by a strong beam current.

The cathode ray tube has widespread usage and is commonly used for transmitting and receiving images in the television field. Basically, the cathode ray tube has an electron gun including a cathode which emits electrons that are concentrated into a beam and appear as a spot of light on a fluorescent screen. A deflection system moves the beam to and fro over the screen. This tube is particularly susceptible to screen damage in the event of a sudden malfunction or failure of any of the input circuits to the tube such as a power loss which could result in a high beam current and local overheating of the screen, called phosphor or screen burn spots. Once burned, these spots do not emit light and result in unexposed areas or blemishes in the photosensitive media of the screen and produce permanent damage and unsatisfactory results, such as when photographing the face of the cathode ray tube.

Typically, the failures in the input circuits to the tube most likely to cause screen damage are loss of a bias voltage, a failure in the deflecting systems, a loss of the unblank control as well as failures or malfunctions in the protection control system being used for the tube. Heretofore, screen protection systems for cathode ray tubes have been provided, but they have not been entirely satisfactory for all applications, and particularly, they have not been fully reliable or fail-safe to meet all contingencies which would result in burning of the screen.

Accordingly, it is an object of this invention to provide a new and improved protection system for the screen of a cathode ray tube which is highly reliable and will ensure screen protection in case of sudden failures or malfunctions of circuits to the tube which would normally control the beam.

Another object of this invention is to provide a novel and improved cathode ray tube protection circuit which combines protective sensing and protective action to prevent excessive beam current from damaging the screen.

Yet another object of this invention is to provide a novel and improved cathode ray tube protection system using several individual control circuits for different parts of the tube for preventing a beam from burning the screen.

Yet a further object of this invention is to provide a novel and improved cathode ray tube protection system whereby normal operating conditions are sensed and applied as voltages to hold the input circuits to the tube in normal operative relationship and automatically release them in a manner to remove a beam from the screen when critical circuit failures or malfunctions occur.

It is still a further object of this invention to provide a novel and improved cathode ray tube protection system using logic circuit techniques to ensure that all possible malfunctions or failures which could result in the burning of the screen are detected and used to positively inhibit the beam from burning the screen.

Briefly stated in accordance with the present invention, the present system has a detecting circuit means for sensing the condition of any of the input circuits to the tube including the power supply and deflection circuits and logically combines any sensed malfunctions to develop a signal indicating that screen protection is required. The protection signal serves to regulate input circuits to the cathode, accelerator grid and horizontal deflection yoke of the tube, and specifically, wherein three protection control circuits are employed in parallel to independently or together regulate the input circuits to the tube in a manner to inhibit a high beam current which could otherwise damage the screen. In practice, power sensing protection is applied independently of logic sensing protection to provide an additional level of reliability.

The foregoing and other objects, features and advantages of the invention will be apparent from the following, more particular description of preferred embodiments of the invention, as illustrated in the accompanying drawings.

Figure 2:
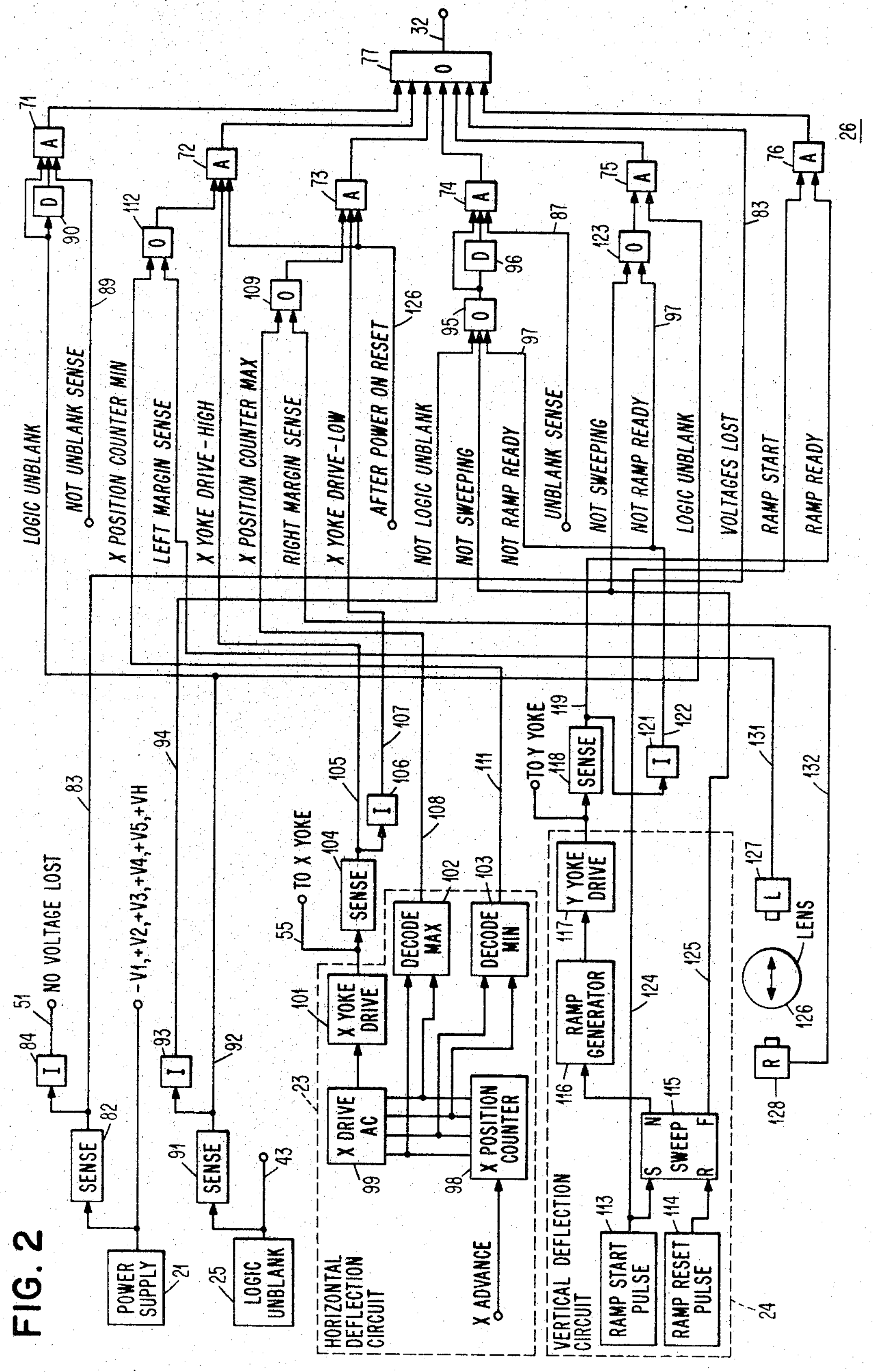

FIG. 1 is a schematic diagram partially in block form of the protection control circuit for a cathode ray tube embodying features of the present invention, and FIG. 2 is a schematic diagram in block form of the several input circuits for the cathode ray tube together with the logic protection circuit embodying features of the present invention.

Referring now to the drawings, in FIG. 1 there is shown a schematic diagram of a typical cathode ray tube designated CRT together with the protection control circuitry for same. The cathode ray tube typically comprises a hollow vacuum sealed container 11 which encloses the tube elements including a cathode heater 12, a cathode 13, a control grid 14 and an accelerator grid 15 being located in the narrower end of the tube and a screen 16 at the opposite enlarged end. A horizontal deflection yoke 17 and a vertical deflection yoke 18 are mounted on the neck portion of the tube.

The basic inputs referred to as the input circuits associated with the tube and used for developing and controlling the impingement of a beam on the tube screen are shown in block diagram form in FIG. 2 and include the power supply 21 which provides the bias voltages and an unblank driver 22 for the cathode, a horizontal deflection circuit 23 and a vertical deflection circuit 24 together with a logic unblank pulse generator 25 for the unblank driver 22. The sudden malfunction or failure of any of these circuits can affect the beam generated on the screen and thereby cause a burning of the screen 16.

The protection control circuit shown in FIG. 1 in general comprises an inverter circuit 31 which, under normal conditions, provides an output signal over line 33 indicating no protection is required to each of the three individual control circuits designated 34, 35 and 36 employed in parallel with one another. Briefly stated, the first or cathode control circuit 34 functions to inhibit the beam current by controlling the voltage produced by the unblank driver 22 for cathode 13. The second or accelerator grid control circuit 35 functions to short any voltage at accelerator grid 15 to ground and the third or horizontal deflection control circuit 36 horizontally deflects the beam off the screen while the voltage at the accelerator grid is decaying to zero.

Referring now to FIG. 1, the first or cathode control circuit 34 includes the unblank driver 22 arranged to apply a voltage to the cathode 13 over line 41 to generate a beam when commanded by the logic pulse generator 25 (FIG. 2). An AND gate 42 is interposed between logic unblank 25 and driver 22 to prevent beam generation when protection is required. The logic generator 25 provides a timing signal or pulse to the AND gate 42 over line 43. The other input signal to the AND gate 42 is from inverter 31 over line 33 which normally permits the driver 22 to apply an operating voltage to the cathode 13 to generate a beam and deconditions the AND gate 42 to prevent the logic unblank generator from turning the driver on when protection is indicated on line 32 into the inverter 31. Under normal conditions, when the signal from the logic unblank 25 reaches the unblank driver 22, the unblank driver changes the voltage between the cathode 13 and the control grid 14. The control grid 14 is clamped to a negative DC bias voltage $-V1$ from the power supply by a diode 44 connected between voltage $-V1$ and the control grid 14 and a capacitor 45 connected between the control grid 14 and ground. The output of the unblank driver 22 thereby controls the voltage between the control grid 14 and the cathode 13 by controlling the voltage of cathode 13. This diode-capacitor network makes the voltage at the control grid 14 drop slowly even though its bias voltage $-V1$ is removed.

The second or accelerator control grid circuit 35 is located in the central portion of FIG. 1. A positive DC bias voltage $+V2$ of a portion 21*a* of the power supply for the accelerator grid 15 normally holds the accelerator grid 15 at a high positive DC voltage indicated as +V2. The "protect" signal over line 32 is also provided as an input signal to power supply 21*a* to turn off the +V2 voltage when protection is indicated. Because of the capacitance in the power supply 21*a* indicated by a capacitor 46 the accelerator grid 15 will not immediately drop to a zero voltage level and it is necessary to short the accelerator grid 15 to ground. The accelerator grid 15 is shorted to ground by use of a normally closed relay, including relay contacts 47, which connect capacitor 46 to ground through a resistor 48 when the contacts 47 are closed.

The relay contacts 47 are opened by a voltage being applied to relay coil 49 and automatically close upon deactivation of the relay coil. Relay coil 49 is activated on the condition that none of the voltages from the power supply 21 have been lost, and when no protection is required. Line 51 transfers the "no voltage lost" signal to one side of coil 49 from the inverter of the sense circuit of the power supply 21, described more fully hereinafter. A PNP transistor 52 is connected between the other side of the relay coil 49 and ground. The signal output line 33 of inverter 31 is connected to the N junction or the base of the transistor 52. The normal output signal of inverter 31 is a negative voltage so that transistor 52 is normally on and the signal over line 51 will, under normal conditions, energize the coil to open the contacts 47 as shown. However, when the "protection required" signal appears on line 32 at the input of inverter 31, line 33 goes positive and transistor 52 turns off so that the coil 49 is deenergized and the contacts 47 close connecting capacitor 46 to resistor 48 to discharge the capacitor 46 and ground the accelerator grid 15.

Having the transistor 52 gated by the "protect" signal through the inverter 31 and also having the relay coil 49 controlled by a "no voltage lost" signal is redundant, since the inverse of the latter signal is also an input to the logic protection circuit 26 of FIG. 2, to be described, which develops an output indicating protection is required when a malfunction in the input circuits occurs. This redundancy is an additional failsafe characteristic in accordance with the present invention.

The third or horizontal deflection control circuit 36 shown in the lower portion of the FIG. 1 is an independent driver arranged to drive any beam produced off the screen when protection is required, by producing additional current through the horizontal deflection yoke 17. Normally, the horizontal deflection of the beam is controlled by a signal from the horizontal or X-yoke drive 101 over line 55 at the base or P junction of an NPN transistor 56 which is connected between one side of the horizontal deflection yoke 17 and has a resistor 57 to ground. A second NPN transistor 58 is normally off and is connected across transistor 56 with a current limiting resistor 59 connected therebetween. A positive DC bias voltage from the power supply +V3 is applied to the yoke 17. Transistor 58 is normally off and therefore current through transistor 56 controls the current through the horizontal deflection yoke 17 and thus the horizontal deflection of the beam. When it is necessary to protect the screen 16, the transistor 58 is turned on and additional current is drawn through the coil of the horizontal deflection yoke 17 so as to drive the beam off the screen.

The voltage for the transistor 58 to the P junction or base is from either a positive DC bias voltage +V4 through resistor 61 or a positive DC bias voltage +V5 through resistor 62 and is enough to turn on the transistor 58. These two bias voltages are arranged so that if one fails the other will be present. The value of these bias voltages are chosen so that even if the power supply fails, these voltages decay off at a slow enough rate so that transistor 58 will be turned on to cause the beam to be horizontally deflected off the screen. A normally open rely including relay contacts 64 is connected between line 33 and the base or P junction of transistor 58. The relay coil 65 also has line 51 connected thereto so it is normally energized on the condition that no voltages from the power supply have been lost. The relay contacts 64 therefore are normally closed as shown connecting the normal "not protect" output of the inverter 31 to the transistor 58 to turn off the transistor. Failure of the no voltage lost condition on relay coil 65 deenergizes the coil which causes the relay contacts to open or drop out so that the transistor bias voltages +V4 and +V5 will turn the transistor 58 on.

From the foregoing, it is apparent that when a protection is indicated from the logic protection circuit 26, the transistor 58 is turned on and the beam is driven off the screen; simultaneously any input signal to the unblank driver 22 from the logic unblank 25 is inhibited to stop generation of the beam current and, at the same time, the voltage to the accelerator grid is turned off and the accelerator grid is shorted to ground. In the event the protection signal applied to turning the beam off at the unblank driver failed, the other two systems are sufficiently capable in themselves to protect the screen. For example, even if the beam current were still on the beam would be driven off the screen and also turned off by action of the accelerator grid being shorted to ground. Therefore, it can be seen that if the first control circuit 34 failed, the other two control circuits 35 and 36 are capable of fully protecting the screen.

In the protection circuits shown, those connected to the unblank driver 22 and the horizontal deflection yoke 17 have a rapid response time and therefore provide what may be referred to as a quick short term protection response. The protection circuit to ground the accelerator grid 15, however, includes the contacts of relay 47 which has a slower response time. The three protection circuits, being connected in parallel, all respond to the same common signal but the protection circuit which grounds the accelerator grid is slower and therefore operative successively after the other two protection circuits for what may be referred to as a slower long term protection response.

Referring now to FIG. 2, the logic protection circuit 26 has six AND gates each operative to deliver an input signal over separate lines to an OR gate 77 which, upon receiving one or more input signals, will apply an input signal to inverter 31 on the condition that protection of the tube is required. Generally, a signal from AND gate 71 indicates that the unblank driver 22 did not turn on in response to an unblank command from the logic unblank 25. A signal from AND gates 72 and 73 indicates that the horizontal deflection circuits are not functioning properly, and a signal from AND gate 74 indicates that the unblank driver is on when it should not be and also indicates a failure in the vertical deflection circuit 25. An output signal from gate 75 indicates that the logic unblank circuit 25 is on when the beam is not moving on the screen. Finally, an output signal from AND gate 76 indicates that the vertical sweep circuit has failed to reset. Generally, the several input signals for the various gates of the logic protection circuit 26 are produced or generated by sensing the condition of the input circuits 21, 22, 23, 24, and 25 above described and providing a signal indicating that a malfunction or failure in one of these circuits has occurred. An inverter circuit is associated with each sense circuit to provide an input signal for the gates on the condition that no malfunction or failure is present.

Power supply 21 produces a plurality of negative and positive bias voltages indicated as a −V1, +V2 through +V5 and VH in FIG. 1, VH being a positive DC bias voltage applied to the cathode heater. A sense circuit 82 for the power supply 21 represents a separate sense circuit for each of the bias voltages −V1, +V2 through +V5 and VH and provides an input signal to OR gate 77 over line 92 if any of these bias voltages have failed or have been lost. The inverter 93 for sense 91 produces an input signal over line 51 to each of the relay coils 49 and 65 above described to energize them in the event no bias voltages from the power supply 21 have failed or otherwise malfunctioned.

The unblank driver 22 shown in FIG. 1 has a sense circuit 86 which applies an input signal to AND gate 74 over line 87 when the unblank driver is not on. The inverter 88 for sense 86 applies an input signal to AND gate 71 over line 89 when the unblank driver is on. A sense circuit 91 for the logic unblank 25 produces an input signal to AND gates 71 and 75 over line 92 when the logic unblank is off or otherwise not functioning properly. This signal over line 92 is also passed through delay stage 90 to AND gate 71. An inverter 93 for sense 91 produces an input signal over line 94 to OR gate 95 which is ahead of AND gate 74 when the logic unblank is on. The output of OR gate 95 is also passed to a delay stage 96 ahead of gate 74.

The horizontal deflection circuit 23 typically includes X position counter 98 with an X input, an X drive 99 which is an AC voltage source and an X-yoke drive 101. A decode maximum circuit 102 and a decode minimum circuit 103 are connected across separate output lines of the counter 98. A sense circuit 104 for the X-yoke drive provides an input signal to AND gate 72 over line 105 when the horizontal yoke drive is high. An inverter circuit 106 for sense 104 applies an input signal to AND gate 73 over line 107 when the horizontal yoke drive is low. The decode maximum 102 provides an input signal to OR gate 109 over line 108 which is ahead of AND gate 73 when the X position counter is greater than a maximum value. In turn, the decode minimum circuit 103 provides an input signal to an OR gate 112 over line 111 when the X position counter is less than a minimum value.

The vertical deflection circuit 24 typically includes a ramp start logic pulse generator 113 and a ramp reset logic pulse generator 114 connected into a sweep circuit 115 together with a ramp generator circuit 116 and a Y-yoke drive 117 at the output of the sweep circuit 115. The sense circuit 118 for the Y-yoke drive 117 applies an input signal to AND gate 76 over line 119 when the Y-yoke drive has failed. An inverter 121 for the sense circuit 118 provides an input signal over line 122 to an OR gate 123 and to OR gate 95 indicating that no failure has occurred in the Y-yoke drive. The ramp start pulse generator 113 delivers an input signal to the AND gate 76 over line 124 indicating that the ramp generator has not started, and the sweep 115 produces an input signal into OR gate 95 and also OR gate 123 over line 125 indicating that the circuit is not sweeping. An "after power on reset" input line 126 provides the third input to each of AND gates 72 and 73 to inhibit the gates until after the power is turned on.

Left and right side pickup devices 127 and 128 sense the margin of the tube using a lens 126. Switch 127 provides an input signal to OR gate 112 over line 131 indicating that the left margin is not set properly and in turn the right margin switch 128 provides a signal to OR gate 109 over line 132 when the right margin is not functioning properly.

Typical voltages and the decode circuit values shown in the drawing included for example but not limitation, are as follows:

| | | |
|---|---|---|
| $-V1$ | volts | $-80$ |
| $+V2$ | do | $+300$ |
| $+V3$ | do | $+15$ |
| $+V4$ | do | $+48$ |
| $+V5$ | do | $+15$ |
| Decode maximum | spaces | 80 |
| Decode minimum | do | 20 |

While the present invention has been particularly shown and described with reference to a preferred embodiment thereof, it will be understood by those skilled in the art that various changes in form and details may be made therein without departing from the spirit of the invention.

I claim:

1. In cathode ray tube apparatus having a cathode ray tube including an accelerator grid, a cathode, and a horizontal deflection yoke and input circuits to the tube including an unblank driver for applying signals to the cathode and a horizontal deflection circuit providing a deflection signal for the horizontal deflection yoke of the tube, the improvement comprising a protection system for the tube including means for monitoring the signals from said horizontal deflection circuit and said unblank driver including a digital logic circuit for producing a common protection signal indicating when protection is required, protection means triggered by said common protection signal including first circuit means having an independent horizontal yoke driver and a relay having contacts for coupling the common protection signal to the yoke driver to actuate the yoke driver, said yoke driver having a high bias voltage and a low bias voltage either of which will actuate a control element of the yoke driver so that if one of said voltages fails the other will act to deflect any beam from the screen by applying a signal to said horizontal deflection yoke for shortterm protection response, and second circuit means for applying a signal to the unblank driver for inhibiting the signal to the cathode for shortterm protection response, and third circuit means having a slower response time and operative successively after said first and second circuit means for grounding the accelerator grid for long term protection response.

2. In cathode ray tube apparatus having a cathode ray tube including an accelerator grid, a cathode, and a horizontal deflection yoke and input circuits to the tube including a power supply for the tube, an unblank driver for applying signals to the cathode and a horizontal deflection circuit providing a deflection signal for the horizontal deflection yoke of the tube, the improvement comprising a protection system for the tube including means for monitoring the output of said power supply and the signals from said horizontal deflection circuit and said unblank driver and including logic circuit means for producing a common protection signal indicating when protection is required, protection means triggered by said common protection signal to provide quick shortterm protection response followed by a slower long term protection response, said protection means including means for applying a signal to said horizontal deflection yoke for deflecting the beam off the screen and for applying a signal to the unblank driver for inhibiting the signal to the cathode for short term protection and including means for grounding the accelerator grid for long term protection.

3. In cathode ray tube apparatus as set forth in claim 2 in which said protection means includes a circuit portion separate of the logic circuit means for normally connecting the associated input circuit in operative relation to the tube on the condition that not any power supply voltages to the tube have failed.

4. In cathode ray tube apparatus as set forth in claim 2 in which said protection means includes a relay having normally closed contacts for grounding the grid, said contacts being held open on the condition that no voltage from the power supply has failed and that the common protection signal is absent.

5. In cathode ray tube apparatus having a cathode ray tube including a cathode, an accelerator grid and a horizontal deflection yoke and input circuits for the tube including an unblank driver for applying signals to the cathode, a power supply voltage for the accelerator grid, and a horizontal deflection circuit providing a deflection signal for the horizontal deflection yoke for developing and directing a beam on the tube screen, the improvement comprising a protection system for the screen comprising:

means for simultaneously sensing for a failure condition of any of the input circuits for developing a common protection required signal, protection means triggered by said common signal to provide quick shortterm protection followed by a slower long term protection including first control circuit means for regulating the signals applied to the cathode from the unblank driver to inhibit generation of beam current, said first circuit means including a logic timing pulse generator arranged for controlling an output voltage from the unblank driver and a gate having input means responsive to the pulse generator to turn the unblank driver on and responsive to the common protection required signal for turning off the unblank driver, second control circuit means for turning off the voltage to the accelerator from the power supply and simultaneously grounding said grid, said second circuit means including a relay having normally closed contacts connecting the accelerator grid to a ground circuit, said contacts being held open by a voltage representing the condition that not any of the voltages from the power supply to the tube have failed and that the protection required signal is absent, and third control circuit means for changing the normal input to the horizontal deflection yoke from the horizontal deflection circuit to deflect any beam generated away from the screen, said third circuit means including an independent horizontal yoke driver having a control element in parallel with said horizontal deflection circuit, a relay having normally open contacts held closed on the conditions that not any of the voltages from said power supply have failed, said protection signal being applied through said relay contacts to actuate the control element and change the current normally drawn through the horizontal deflection yoke.

6. In cathode ray tube apparatus as set forth in claim 5 wherein said first, second and third control circuit means are coupled in parallel to one another to function simultaneously and independently in response to said common protection required signal.